No. 869,864. PATENTED OCT. 29, 1907.
F. B. COOK.
AUTOMATIC RESETTING AND TESTING MEANS FOR THERMAL PROTECTORS.
APPLICATION FILED APR. 28, 1906.
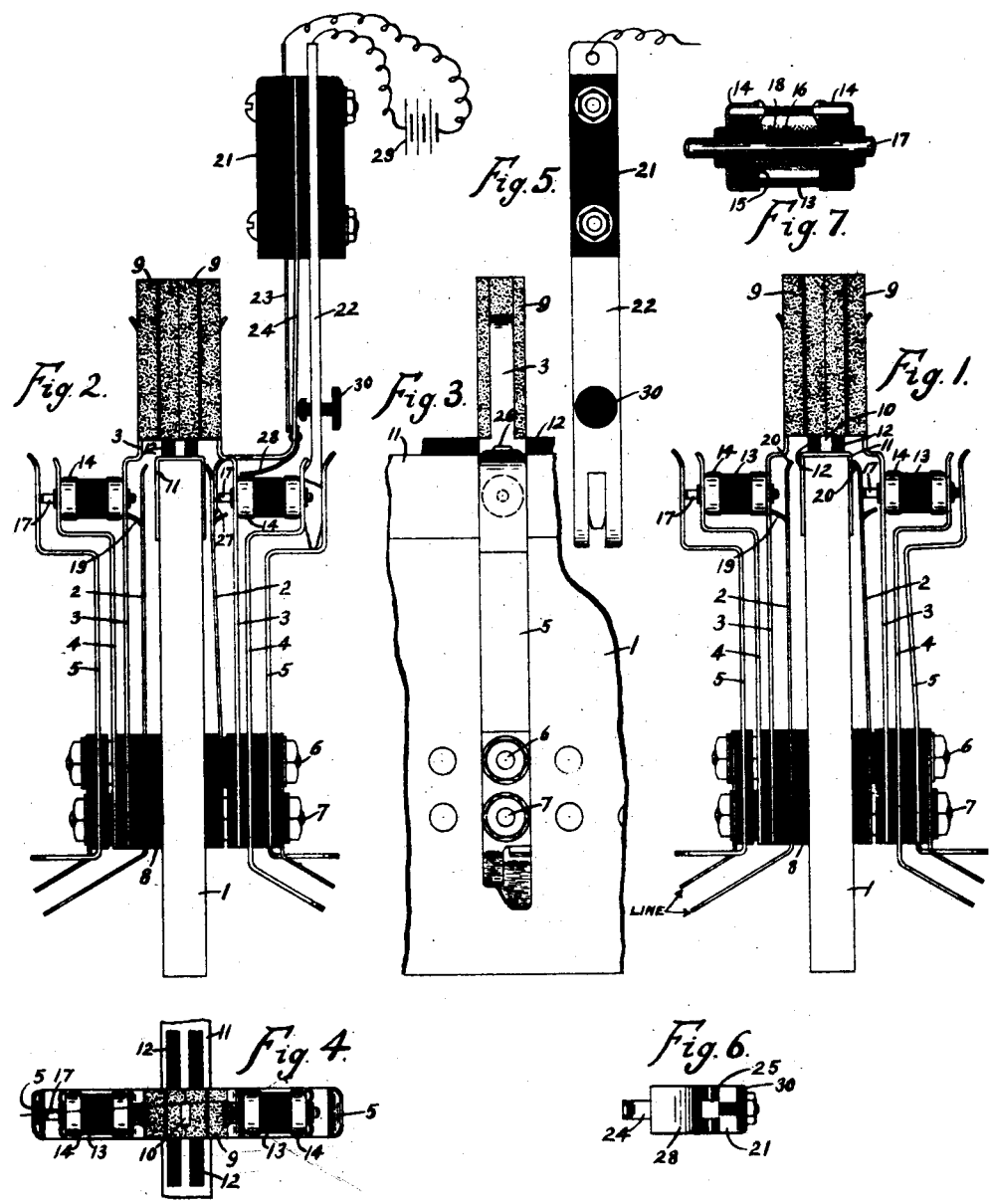

UNITED STATES PATENT OFFICE.

FRANK B. COOK, OF CHICAGO, ILLINOIS.

AUTOMATIC RESETTING AND TESTING MEANS FOR THERMAL PROTECTORS.

No. 869,864.　　　　Specification of Letters Patent.　　　　Patented Oct. 29, 1907.

Application filed April 28, 1906. Serial No. 314,195.

*To all whom it may concern:*

Be it known that I, FRANK B. COOK, a citizen of the United States of America, residing at Chicago, in the county of Cook and State of Illinois, have invented a new and useful Automatic Resetting and Testing Means for Thermal Protectors, of which the following is a specification, reference being had to the accompanying drawings, illustrating same.

My invention relates to electro-thermal protective apparatus and more particularly to means for automatically testing and resetting same for another operation after it has operated.

The broad idea of closing a current of electricity through a thermal protector to reheat same and reset same in the circuit for another operation, is contained in my copending application for Letters Patent, Serial No. 271,662, filed July 28th, 1905. A modification of the invention contained in the said application Serial No. 271,662, is shown, described and claimed in my copending application for Letters Patent, Serial No. 373,140, filed May 11th, 1907.

The principal objects of my invention are to provide improved means for automatically resetting a reversible heat cartridge and the apparatus associated therewith, for another operation, after it has operated; to provide improved means for testing such a reversible heat cartridge without removing same from the protective apparatus; to provide improved means for testing the heat cartridge while same is removed from the protective apparatus; and to provide simplicity and durability in the automatic resetting means.

Other objects will be apparent from the following specification.

In electrical protective apparatus comprising a reversible heat cartridge, that is, a heat cartridge which must be reversed in position before it can be operated again in the apparatus, it is necessary to perform the extra operation of reversing the heat cartridge before the apparatus can be set to operative position, and then the condition of the heat cartridge is not tested to ascertain whether it is in condition for another operation.

In my present invention I do away with the necessity of removing the heat cartridge and reversing same, to reset the apparatus to operative position, by applying automatic means thereto to reheat and automatically reset same for another operation; this process of resetting the protector also testing its serviceable condition.

The heat cartridge preferably illustrated herein is of the type comprising a central movable member operable endwise and reversible after operation for another operation, but this particular construction in the cartridge is not essential to the invention.

Referring to the accompanying drawings illustrating the preferred form of my invention, Figure 1 is a side elevation of a pair of heat cartridges in connection with their protective apparatus, mounted on opposite sides of a mounting plate, the apparatus on one side of the plate being shown in a set position and that on the other side in on operated position; Fig. 2 is a view similar to Fig. 1, but also showing the automatic resetting device applied to the operated heat cartridge and apparatus; Fig. 3 is an edge elevation of Fig. 1; Fig. 4 is an end view of Fig. 2, with the automatic resetting device removed; Fig. 5 is an edge elevation of the automatic resetting device of Fig. 2; Fig. 6 is an end view of Fig. 5; and Fig. 7 is a longitudinal cross-sectional view of the heat cartridge of the apparatus, with a portion shown in elevation.

Like characters refer to like parts in the several figures.

On the mounting plate 1, which is preferably grounded, spring members 2 2, 3 3, 4 4, and 5 5 are mounted by bolts 6 and 7 and suitably insulated from one another by insulation 8. The free ends of springs 3 3 are adapted to hold lightning arresters 9 9 in place against a metallic pin 10 which is electrically connected with plate 1 and suitably mounted thereon. A ground strip 11 is preferably placed over one edge of plate 1, to be used as a contact member for the free ends of springs 2 2 when the latter are depressed as shown on the right hand side of Fig. 1. Insulating strips 12 12 are placed between the strip 11 and the inner carbons of lightning arresters 9 9 to form a stop for the latter. The thermal protectors 13 13 are each inserted between a spring 3 and the free end of spring 4, preferably as shown, so that the end caps 14 14 make electrical connection with the respective springs. In the thermal protector or heat cartridge 13, the spool 15 carries the heat-producing winding 16 and has a pin 17 normally soldered therethrough by easily-fusible solder 18, the terminals of winding 16 being soldered to end caps 14 14 which are suitably insulated from the spool 15 and the pin 17. When the heat-susceptible material 18 is softened, the pin 17 is free to move in either direction, endwise, through the heat cartridge. Contact 19 on spring 2 normally engages spring 3, and the outer end of pin 17 normally engages spring 5. Contact 20 of spring 2 is adapted to engage the ground strip 11 when spring 2 is depressed as shown on the right of Fig. 1. Springs 2 2 are preferably line springs, where such apparatus is used in connection with telephone systems or the like, and springs 4 4 are preferably switchboard springs. Springs 5 5 are alarm springs and are preferably connected in common in the usual manner.

The main circuit through the heat cartridge 13 is from line spring 2, through contact 19, one end cap 14, winding 16, the other end cap 14, and switchboard spring 4, to the switchboard circuit and apparatus. The alarm circuit may be from pin 17 through spring 5 and any suitable battery and indicating device, to ground; this circuit being closed when the pin 17 makes electrical connection with the ground plate 1, in a manner well understood.

The operation of the device is as follows: When an abnormally large current traverses the winding 16 of the heat cartridge 13 for a sufficient length of time, it produces heat in the winding 16, which heat is conducted to the easily-fusible solder 18 to soften same. When solder 18 is sufficiently softened, spring 5 presses pin 17 through the cartridge 13 until the inner end thereof engages spring 2 and forces the latter into connection with the ground strip 11, at the same time breaking the contact between contact 19 and spring 3. This operation of the apparatus opens the circuit through winding 16 at 19, grounds line spring 2 on ground strip 11 at 20, and closes the alarm circuit between pin 17 and ground plate 1 through a portion of the free end of spring 2. After operation, the apparatus is in the position shown on the right of Fig. 1, the pin 17 having been moved until the inner end thereof now projects from the cartridge the same distance as the outer end thereof did before the operation of the apparatus.

To reset the apparatus to operative position for another operation, it is generally customary to remove the cartridge 13 from the apparatus, turn same end for end, and reinsert it as shown on the left of Fig. 1. When this is done, the apparatus may be operated the same as originally, the pin 17 however being now operated back to its original position relatively to the cartridge. With the automatic resetting tool, a description of which follows, it is not necessary to reset the apparatus to operative position as just described. The improved means of resetting the apparatus, which comprises a part of the present invention, will be fully described below.

The automatic resetting device or tool shown in Figs. 2, 5 and 6, comprises an insulating handle portion 21 which carries a rigid metallic piece 22 and spring members 23 24, suitably insulated from each other. The free end of member 22 is adapted to be inserted between the free ends of springs 4 and 5, as shown in Fig. 2, the end portion of 22 being slotted as at 25, Fig. 6, so as to straddle the end portion of pin 17. The free end of spring 24 is made narrow so as to be inserted through a slot 26 in spring 3, the end 27 being forced between the free end of spring 2 and the inner end of pin 17. A small leaf spring 28 is preferably provided on spring 24 to make electrical connection with one end cap 14 of the heat cartridge 13, to assist in closing the circuit of battery 29 through winding 16 of the cartridge when it is desired to heat the latter. The free end of spring 23 is provided with a contact adapted to engage spring 24 when the latter is depressed. Battery 29 is connected in circuit with spring 23 and member 22. The thumb-piece 30 is preferably provided on the resetting tool to be depressed to separate the free end of spring 24 the desired amount from the free end of member 22 when the resetting tool is inserted in the apparatus as shown in Fig. 2. When the thumb piece 30 is depressed, spring 24 engages the free end of spring 23, thus closing the circuit of battery 29 from spring 24 through the battery to member 22.

In resetting the protective apparatus from an inoperative position as shown on the right of Fig. 1, to an operative position as shown on the left of Fig. 1, the resetting tool is inserted in the operated apparatus as shown on the right of Fig. 2, the free end of member 22 making electrical connection with spring 4 and also forcing the free end of spring 5 out of contact with the outer end of pin 17, and the free end of spring 24 bearing against the inner end of pin 17 between the latter and spring 2 and making electrical connection with the inner end of cartridge 13 through the leaf spring 28. The circuit of battery 29 is now closed through member 22, one end cap 14 of the cartridge, winding 16, the other end cap 14, leaf spring 28, a portion of spring 24, and spring 23. The current from battery 29 now heats winding 16 and thereby softens the solder 18 in a short time. When solder 18 is sufficiently softened, the free end 27 of spring 24 forces pin 17 outward to the position shown on the left of Fig. 2, spring 24 at the same time disengaging spring 23, just as the apparatus is fully reset, and thereby cutting off the current of battery 29 from winding 16. If desired, the leaf spring 28 may be arranged so as to open the circuit of battery 29 through the heat cartridge, by disengaging the end cap 14 just as the pin 17 is fully reset. This does away with spring 23. The current from battery 29 being now cut off from the heat cartridge, the heat subsides and solder 18 hardens, thereby securing pin 17 in its reset position as shown on the left of Fig. 2. The resetting tool may be now removed from the apparatus, such removal causing spring 2 to engage spring 3 at contact 19, and the free end of spring 5 to engage the outer end of pin 17, as originally. Now the apparatus may be again operated by an abnormally large current in the line circuit as originally.

The cycle of operations, comprising the operation and resetting of the apparatus as just described, may be repeated as many times as desired. It will be seen that in resetting the apparatus, the cartridge is heated and operated the same as by an abnormally large current in the line circuit, but in an opposite direction. This resetting the apparatus tests the serviceable condition of the thermal protector or cartridge 13, for the reason that if it will properly reheat, reset and resolder, it must be in good condition to reheat and operate again from an abnormally large current in the line circuit. If the protector will not reheat, reset and resolder properly, it shows that it is not in condition to be operated again by an abnormally large current in the line circuit, and should be replaced by a new cartridge. Thus, it will be seen, that it is impossible to have a line circuit through the protective apparatus provided with a defective heat cartridge, when the apparatus is in set position.

It will readily be seen that the heat cartridge 13 may be removed from the protective apparatus and the resetting tool of Figs. 2, 5 and 6 then applied thereto the same as in the apparatus in Fig. 2, to simply heat the cartridge and operate the pin 17 as a test on the condition of the cartridge. This provides a very simple method of testing such heat cartridge, even if it is not desired to reset the apparatus to operative position.

I do not wish to limit the construction of the device of this invention to the particular details as herein shown, as modifications may be made therein without departing from the scope of the invention.

What I claim as my invention and desire to secure by Letter Patent is:

1. A resetting tool for a reversible electro-thermal protector having a central operable member, comprising means for applying current to the protector to heat same, and spring mechanism for operating the central operable member in one direction to reset same for another operation in a reversed direction.

2. A resetting tool for an electro-thermal protector having a central operable member, comprising means for applying current to the protector to heat same, and means for operating the central operable member when the protector is thus heated, the resetting tool being constructed to reset the protector in circuit for operation when removed therefrom.

3. A resetting tool for a reversible electro-thermal protector having a central operable member, comprising electromechanical means for heating the protector and operating the central operable member in one direction to set the protector for another operation in a reversed direction.

4. A testing device for an electro-thermal protector having a central operable member, comprising means for applying current to the protector to heat same, and means for operating the central operable member when the protector is thus heated, as a test on the condition of the protector.

5. A resetting tool for a reversible electro-thermal protector having a central operable spindle extending therethrough and a spring member bearing against one end of the spindle to operate same, comprising a portion for bearing the said spring member away from the end of the spindle, a spring member for engaging the opposite end of the spindle to operate same upon heating, and means for closing a heating current through the protector.

6. A resetting tool for an electro-thermal protector having an operable pin extending therethrough, comprising means for closing a circuit through the protector for heating, and a spring adapted to bear against one end of the said pin to operate same when the device is properly heated, for purposes substantially as described.

7. A testing tool for a heat cartridge having a central operable spindle, comprising means for closing a current through the cartridge to heat same, and means for moving the spindle endwise when the cartridge is heated, to test same.

8. A resetting tool for electro-thermal protectors, comprising a rigid portion, a pair of spring members normally out of contact with each other, and a thumb piece carried by the rigid portion for depressing one of the spring members into electrical connection with the other and for arranging the position of the several members suitable for applying the tool to a protector to reset same.

As inventor of the foregoing I hereunto subscribe my name in the presence of two subscribing witnesses this 24th day of April, 1906.

FRANK B. COOK.

Witnesses:
FREDERICK R. PARKER,
F. W. PARDEE.